Feb. 20, 1951 — MacMILLAN CLEMENTS — 2,542,860
EDGE CONSTRUCTION
Filed Jan. 19, 1946
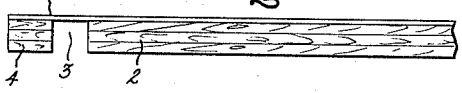
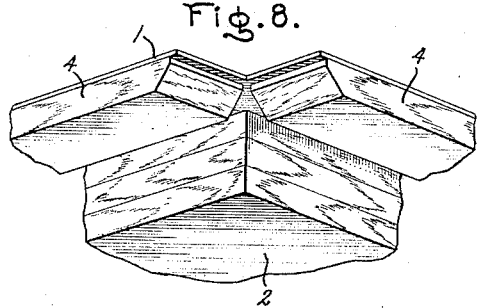
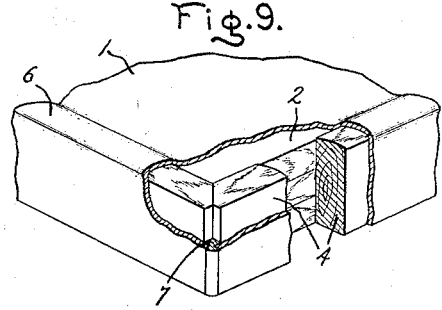
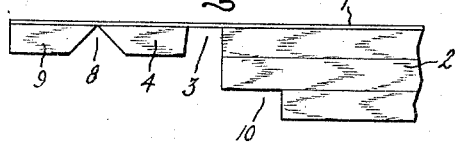
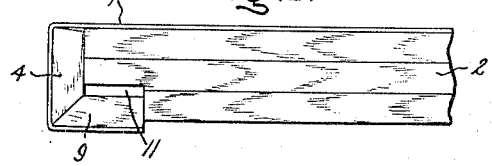
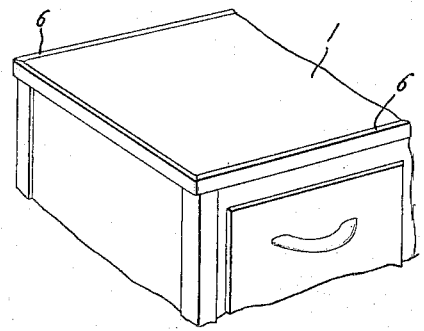
Inventor:
MacMillan Clements,
by Gilbert P. Tarleton
His Attorney.

Patented Feb. 20, 1951

2,542,860

UNITED STATES PATENT OFFICE 2,542,860

EDGE CONSTRUCTION

MacMillan Clements, Southport, Conn.

Application January 19, 1946, Serial No. 642,279

8 Claims. (Cl. 20—91)

This invention relates to improvements in edge construction, such as a flanged edge with a raised bead on work surfaces, and more particularly to a novel edge construction for laminated sheet material and to a method of forming such an edge.

Laminated sheet material, such as a thin metal skin bonded to a thick organic backing layer, is light, strong, relatively inexpensive and wear-resistant. One use of such material is as a work surface, such as a table or counter top. In applications of this kind sharp edges must be avoided and also the edge should have a raised bead so as to prevent articles and liquids from dropping off the edge too easily.

In accordance with this invention the backing layer is cut in a certain way and the skin so bent or folded as to produce a novel flanged edge with a raised bead.

An object of the invention is to provide a novel and simple edge construction for work surfaces.

Another object of the invention is a novel method of working a sheet of laminated material so as to produce an improved flanged edge with a raised bead.

The invention will be better understood from the following description taken in connection with the accompanying drawing and its scope will be pointed out in the appended claims.

In the drawing Fig. 1 is a cross-sectional view of a sheet of laminated material which is to be provided with my novel edge construction, Fig. 2 illustrates the first step in my method, Fig. 3 illustrates the second step and Fig. 4 illustrates the final step, Fig. 5 illustrates a modification which is adapted for use with sheets having an especially thick backing layer, Fig. 6 shows how the structure illustrated in Fig. 5 is bent during an intermediate step in the production of the beaded edge, Fig. 7 shows the final step and the completed modified edge, Fig. 8 is a perspective view showing the corner construction of a half completed edge, Fig. 9 is a broken away perspective view of a completed corner construction, Fig. 10 is a perspective view of a work table or cabinet whose top is provided with my invention, and Figs. 11, 12 and 13 illustrate another modification of the invention.

Referring now to the drawing and more particularly to Fig. 1, the sheet of laminated material which is shown in cross section may consist of a relatively thin skin 1 bonded by any suitable adhesive means (not shown) to a relatively thick backing layer 2. The skin 1 is preferably made of thin gauge metal, such as copper or stainless steel, and the material which at present is preferred for the backing layer is plywood, although many other organic materials, such as pressboard, are suitable. In Fig. 2 a groove 3 has been formed in the backing layer 2 parallel to the left-hand edge of the sheet. The width of this groove is not less than and preferably substantially equal to the thickness of the backing layer and it will be noted that this groove is formed by cutting away the backing layer all the way up to the skin 1. Between the left-hand edge of the sheet and the groove there is a strip 4 of the backing material. The width of this strip corresponds to the width of the flange to be formed on the edge of the sheet and it is preferably substantially equal to the thickness of the backing layer plus the desired height of the raised bead.

The next step in the formation of the improved edge is to bend the skin 1 on the straight line formed by the intersection of the plane of the outer wall of the groove 3 and the skin 1, which bend will constitute the edge of the surface. The skin is bent until the strip 4 is rotated approximately ninety degrees into the position shown in Fig. 3 in which the strip 4 now, in effect, fills the groove 3. It will be observed that the strip 4 extends below the bottom surface of the backing layer 2 a short distance.

The raised bead is formed by pushing the end of the strip 4 upwardly, as viewed in the drawing, relative to the backing layer 2, or of course pushing the backing layer 2 down relative to the end of the strip 4 so as to bring their two surfaces into the same plane and make them flush. This action of course forces the skin at the edge up so as to form the raised bead 6 shown in Fig. 4. The backing layer 2 and the strip 4 can then be held together in any suitable manner, such as by adhesive means or the corrugated fastener 5 illustrated.

In the modification shown in Figs. 5, 6 and 7 the backing layer 2 is relatively very much thicker than in the first four figures. In this modification it will be observed that not only is a groove 3 formed by cutting away the portion of the backing layer which is shown shaded but also some of the bottom surface of the backing layer 2 is cut away. However, the relation between the width of the groove 3 and the thickness of the remaining portion of the backing layer forming the strip 4 is the same as in the first four figures. A further difference between the two modifications, however, is that the outer wall of the groove 3 is shown slightly inclined or beveled instead of being perpendicular to the skin 1 as in the first four figures. By cutting away the backing layer as shown by the shaded portion in Fig. 5 it is possible to have a relatively narrow bead and at the same time have a relatively long flange. The beveling of the outer edge of the groove also promotes the formation of a smoother raised bead and reduces the strain on the adhesive bond between the skin 1 and the backing layer 2 when the bead is formed.

In Fig. 6 the skin has been bent and the strip 4 rotated as explained above in connection with Fig. 2, and in Fig. 7 the end of the strip 4 and the bottom surface of the backing layer 2 have been made flush with each other so as to form the raised bead 6 on the edge of the material. It will be noted from Figs. 6 and 7 that the beveled edge of the strip 4 which formerly formed one of the walls of the groove 3 has the same general slope as that of the raised bead 6 so that there is not so much tendency as in Fig. 4 for unduly compressing the corner of the strip 4 or pulling the skin away from the backing strip when pressure is applied in order to raise the bead.

In Fig. 8 a perspective view of a partially completed corner construction employing my method of forming a flanged edge with a raised bead is illustrated. This is essentially the same as has already been described except that the edges of the flanges where they come together are beveled at an angle of forty-five degrees and preferably some of the backing material adjacent the metal edges which come together to form the corner is cut away so as to facilitate joining these edges. Fig. 9 is a broken away perspective view of the finished corner joint embodying my invention and with the metal at the corner fastened together or joined by the process described in my prior Patent 2,255,151 which consists of filling the channel formed by the inner surfaces of the abutting metal skin members at the corner and the cut away portions of the backing material with solder 7 or with a metal strip to which the metal skin members are welded.

A perspective view of a table top or cabinet top provided with the invention is shown in Fig. 10. This illustrates how the raised edge or bead 6 on the metal work surface 1 runs entirely around all the top edges of the work surface.

In some cases there may be an objection to the above-described constructions because of a possibility of relatively sharp metal edges or corners being produced along the bottom of the edge of the work surface. This may be eliminated by constructing the raised edge in the manner shown in Figs. 11, 12 and 13. In Figure 11 the groove 3 in the backing material is set back considerably further from the edge of the material than in the previous figures and a V groove 8 is cut between the outer edge of the material and the generally rectangular groove 3 so as to form an outer edge strip 9 of the backing material. The strip 4 which previously was the outer edge strip will now be between the grooves 3 and 8. In addition, material is cut out of the backing material at the bottom, as indicated at 10, for the purpose of receiving the outer edge strip 9. Fig. 12 shows how the strip 4 is folded or bent at right angles so as to fill the groove 3 and this figure also shows how the outer edge strip 9 is bent through an additional right angle toward the backing material so as to close the V groove 8. When the doubly bent edge strip is forced toward the work surface so as to close the gap 11 between the edge strip 9 and the backing material the raised edge or bead 6 is formed as in the previous figures and as is shown specifically in Fig. 13.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. The method of forming a raised edge for a work surface made of laminated sheet material having a thin wear-resistant top skin bonded to an underlying organic backing layer which includes the steps of forming a rectangular groove in said backing layer parallel to said edge while leaving a strip of said backing layer in place between said groove and said edge with the width of the strip being at least equal to the width of the groove plus the length of the raised edge to be formed, rotating said strip toward said groove in a plane perpendicular to the surface of said skin for about 90° until the strip fills the groove, and then forcing said strip transversely to the face of the strip to force up the metal skin and thus form an inclined raised edge at the end of said work surface.

2. The method of claim 1 in which the strip is forced up until the under side of the strip is substantially in the same plane as the under side of the backing layer.

3. The method of claim 1 in which the outer wall of the groove forming the inner side wall of the strip is beveled during the formation of said groove.

4. The method of claim 1 in which a lower portion of the strip has been removed prior to the step of rotation of said strip.

5. The method of claim 1 in which a pair of raised edges are formed at an angle to each other on juxtaposed sides of the sheet material, beveling the edges of said flanges where they come together at about an angle of 45 degrees and joining the abutting vertical edges of the skin where they meet each other.

6. The method of claim 1 in which two grooves and two strips are formed, the second groove being of V-shape and in which both strips are forced upwardly in forming the raised edge.

7. A laminated sheet having a raised edge comprising a top metal skin and a sheet of laminated material bonded to said skin, said sheet of material having a portion removed from its under side to form a recess adjacent one edge thereof, a pair of strips, one of said strips being mounted in said recess, the other of said strips extending across the edge of said material and having an extension above the upper surface of material, said skin having an inclined upper surface above said extension and a second portion extending downwardly and covering the side of said last named strip.

8. A laminated sheet having a raised edge comprising a top metal skin and a sheet of laminated material bonded to said skin, said sheet of material having a portion removed from its under side to form a recess adjacent one edge thereof, a pair of strips, one of said strips being mounted in said recess, the other of said strips extending across the edge of said material and having an extension above the upper surface of material, said skin having an inclined upper surface above said extension and a second portion extending downwardly and covering the side of said last named strip, said strips each having beveled edges in abutting relationship, said skin covering the exposed surfaces of both of said strips.

MACMILLAN CLEMENTS.

REFERENCES CITED

The following references are of record in the file of this patent:

UNITED STATES PATENTS

| Number | Name | Date |
|---|---|---|
| 1,440,615 | Meyercord | Jan. 2, 1923 |
| 1,630,858 | Meyercord | May 31, 1927 |
| 1,711,471 | Curran | Apr. 30, 1929 |
| 2,002,228 | Meyercord et al. | May 21, 1935 |
| 2,149,882 | Clements | Mar. 7, 1939 |
| 2,418,612 | Zalkind | Apr. 8, 1947 |